(12) United States Patent
Grattan

(10) Patent No.: US 6,845,875 B2
(45) Date of Patent: Jan. 25, 2005

(54) CONVERTIBLE CARGO BOX-BED LINER FOR SPORTS UTILITY VEHICLE, VAN, OR PICK-UP TRUCK

(76) Inventor: Alan Grattan, R.R. 12, Brockville, Ontario (CA), K6V 5T2

( * ) Notice: Subject to any disclaimer, the term of this patent is extended or adjusted under 35 U.S.C. 154(b) by 28 days.

(21) Appl. No.: 10/294,924

(22) Filed: Nov. 14, 2002

(65) Prior Publication Data

US 2003/0089711 A1 May 15, 2003

(30) Foreign Application Priority Data

Nov. 15, 2001 (CA) ............................................. 2362249

(51) Int. Cl.$^7$ ................................................ B65D 6/28
(52) U.S. Cl. ....................... 220/4.22; 220/818; 220/819; 220/4.23
(58) Field of Search ............................. 220/4.22, 4.23, 220/810, 817, 818, 819

(56) References Cited

U.S. PATENT DOCUMENTS

| | | | |
|---|---|---|---|
| 709,663 A | * | 9/1902 | Budweiser .................. 220/817 |
| 4,333,678 A | | 6/1982 | Munoz et al. |
| D271,010 S | | 10/1983 | Stephenson |
| 4,518,194 A | | 5/1985 | Kirkham et al. |
| 4,635,797 A | * | 1/1987 | Bankier ...................... 206/472 |
| 5,145,068 A | * | 9/1992 | Schmitz et al. .............. 206/472 |
| 5,152,710 A | * | 10/1992 | Montgomery ................. 446/75 |
| 5,456,514 A | | 10/1995 | Justice |
| 5,464,264 A | | 11/1995 | Wilson |
| 5,755,481 A | | 5/1998 | Emery |
| 5,800,145 A | | 9/1998 | Kelce |
| 6,454,115 B1 | * | 9/2002 | Allasia ....................... 220/4.23 |

* cited by examiner

Primary Examiner—Joseph Man-Fu Moy
(74) Attorney, Agent, or Firm—Schmeiser, Olsen & Watts

(57) ABSTRACT

A transformable storage and protection apparatus comprising a top half portion; a bottom half portion; a back portion; first hinge means disposed between the top half portion and the back portion; and second hinge means disposed between the bottom half portion and the back portion, wherein the transformable storage and protection apparatus transforms between (1) a first configuration in which the top half portion, the bottom half portion and the back portion form a closed container; and (2) a second configuration in which the top half portion is pivoted along the first hinge means, and said back portion is pivoted along the second hinge means thereby forming a single planar bottom area.

9 Claims, 5 Drawing Sheets

CONVERTIBLE CARGO BOX-BED LINER FOR SPORTS UTILITY VEHICLE, VAN, OR PICK-UP TRUCK

FIELD OF THE INVENTION

The present invention relates to an apparatus for protecting both a vehicle user's possessions and protecting the vehicle's cargo area, and specifically, relates to a storage box for a vehicle which converts into a bed liner when required.

BACKGROUND

In vehicles such as pick-up trucks, sports utility vehicles (SUVs), and vans, the security of the user's belongings is often an issue. In pickup trucks, the truck bed is generally exposed, and items cannot safely be left in this area without fear of theft. Often the only other option for this type of vehicle is to put items into the cab.

Security is however not much better in the cab of pickup trucks. This area is generally surrounded by windows and users may be unable to hide items from view. Similarly, SUVs and vans have windows that expose the entire inner area of the vehicle, including the cargo area, to outside observers. It is therefore easy for potential thieves to see what is inside the vehicle.

Several inventions have attempted to overcome this problem. U.S. Pat. No. 4,288,011 to Grossman, U.S. Pat. No. 4,448,669 to Waters and U.S. Pat. No. 4,770,330 to Bonstead et al. all teach boxes that can be affixed to the cargo area of pickup trucks.

The main problem with these inventions is that they consume a significant amount of the cargo space of the vehicle. Thus, in situations when the entire cargo area is needed, these inventions need to be removed from the vehicle. This can be both cumbersome and logistically a problem if the user is not in a location at which the box can be stored safely.

One attempt to overcome this problem is found in U.S. Pat. No. 5,464,264 to Wilson. Wilson teaches a fold-down box and permanently attached cargo liner. In this patent, the box can be folded down to expose the entire cargo area.

The Wilson patent also has a number of shortcomings. This patent is not easily adapted to SUVs and vans, since there is a permanent cargo liner as part of the invention. In SUVs and vans it is undesirable to have a permanent cargo liner, since seating is often provided in the cargo area. However, it would be desirable to have this type of liner to protect the flooring or carpet in these types of vehicles when moving cargo.

A second problem with the Wilson invention is that it requires modifications to the actual cargo area of the pickup truck. This is an expensive after-market addition that would make it undesirable to some users.

SUMMARY OF THE INVENTION

The present invention attempts to overcome the above problems by providing a storage box that is convertible into a bed liner. The box can be used to store objects out of sight of potential thieves, thus reducing the likelihood the vehicle will be broken into. The box is provided with security locks to further deter thieves.

If the vehicle user needs to use the cargo area of the vehicle to transport objects that may be damaging to the vehicle, the storage box of the present invention can be transformed into a bed liner that preferably covers the entire cargo area. Further, the bed liner allows the user to utilize the entire cargo area.

This bed liner protects both the bottom of the vehicle and the sides up to the height of the liner. The sides of the liner further prevent loose objects from falling out of the liner during driving. Further, no modification to the vehicle is necessary to use this apparatus.

The transformation of the box to the bed liner is facilitated using a hinged mechanism to separate the top half of the box from the bottom half of the box, and pivotable panels on the rear of the box. When the box is opened initially, the back of the box will be folded along a central hinge line, but this folded back portion will still remain vertical, creating a partition in the cargo bed liner. The pivotable nature of the rear panels allows the user to expand the top half away from the bottom half, extending the depth of the cargo liner and eliminating this partition by transforming it into part of the bottom of the cargo liner.

The pivotable panels further have side members, and form a part of the side for the bed liner in its expanded form. These side members fit precisely within the sides of the box when the present invention is in its closed form.

The present invention therefore provides a transformable storage and protection apparatus comprising: a top half portion; a bottom half portion; a back portion; first hinge means disposed between said top half portion and said back portion; and second hinge means disposed between said bottom half portion and said back portion, wherein said transformable storage and protection apparatus transforms between (1) a first configuration in which said top half portion, said bottom half portion and said back portion form a closed container; and (2) a second configuration in which said top half portion is pivoted along said first hinge means, and said back portion is pivoted along said second hinge means thereby forming a single planar bottom area.

DETAILED DESCRIPTION OF THE DRAWINGS

Figure 1:
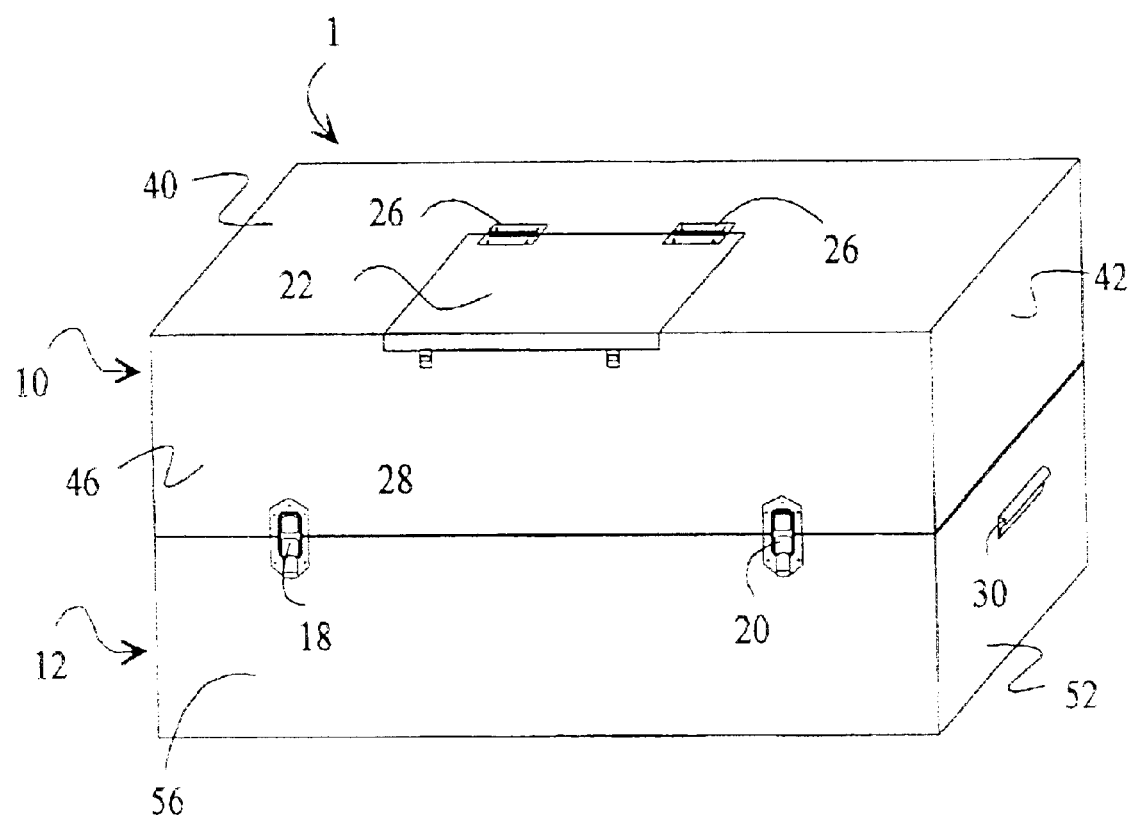
FIG. 1 is a front perspective view of the convertible cargo box-bed liner in its box state.

Reference is now made to the drawings. FIG. 1 shows the box-bed liner apparatus 1 in its closed configuration. In this configuration the invention provides a secure location in which to store belongings. A vehicle user can place items in the box, ensuring they are out of the sight of any potential thief, and through locking mechanisms (not shown), can add an additional level of security for the items.

Box-bed liner apparatus 1 consists of a top half 10 and a bottom half 12. Top half 10, in a preferred embodiment, is comprised of top panel 40, side panels 42 and 44, and front panel 48. Similarly, bottom half 12 is comprised of bottom panel 50, side panels 52 and 54, and front panel 56. In a preferred embodiment, top half 10 and bottom half 12 have the same dimensions.

Halves 10 and 12 are pivotally joined by hinges 14 and 16 along their rear edges. Further, top half 10 and bottom half 12 are held together along their front edge by latch mechanisms 18 and 20. Hinges and latch mechanisms are well known in the art, and it is envisioned that alternative pivoting and securing means could also be used.

Besides latch mechanisms 18 and 20, a preferred embodiment of the invention will also include means to lock halves 10 and 12 together. Among other examples, this means could be a lock affixed to the outside of box-bed liner 1, or a latch mechanism on the inside of the box which would be accessible through access port 22, as described below.

Figure 2:
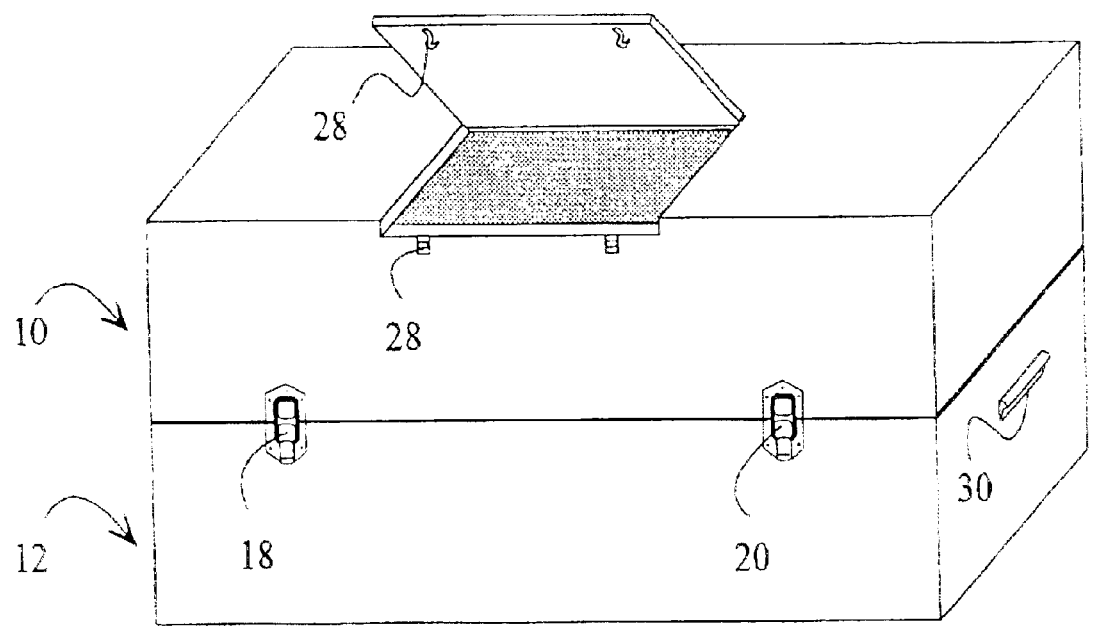
FIG. 2 is a perspective view of the convertible cargo box-bed liner of FIG. 1 with the lid access in a partially open position.

Access port 22 provides access into box-bed liner 1 when in the box configuration. It is situated on the top of top half 10 and can be opened or closed without having to separate top half 10 from bottom half 12. In a preferred embodiment the rear of access port 22 is hinged to top half 10 through hinges 24 and 26. Access port 22 can further be secured along its front end through a latch or lock mechanism. FIG. 2 shows one embodiment in which a hook and eye securing mechanism 28 is used to hold the port closed.

Box-bed liner apparatus 1 is further provided with handles 30, affixed to the sides of bottom half 12. In the preferred embodiment of the present invention, apparatus 1 is able to be easily placed within and removed from the cargo area of SUVs, vans or pick-up trucks. Handles 30 facilitate this movement of apparatus 1.

Figure 4:
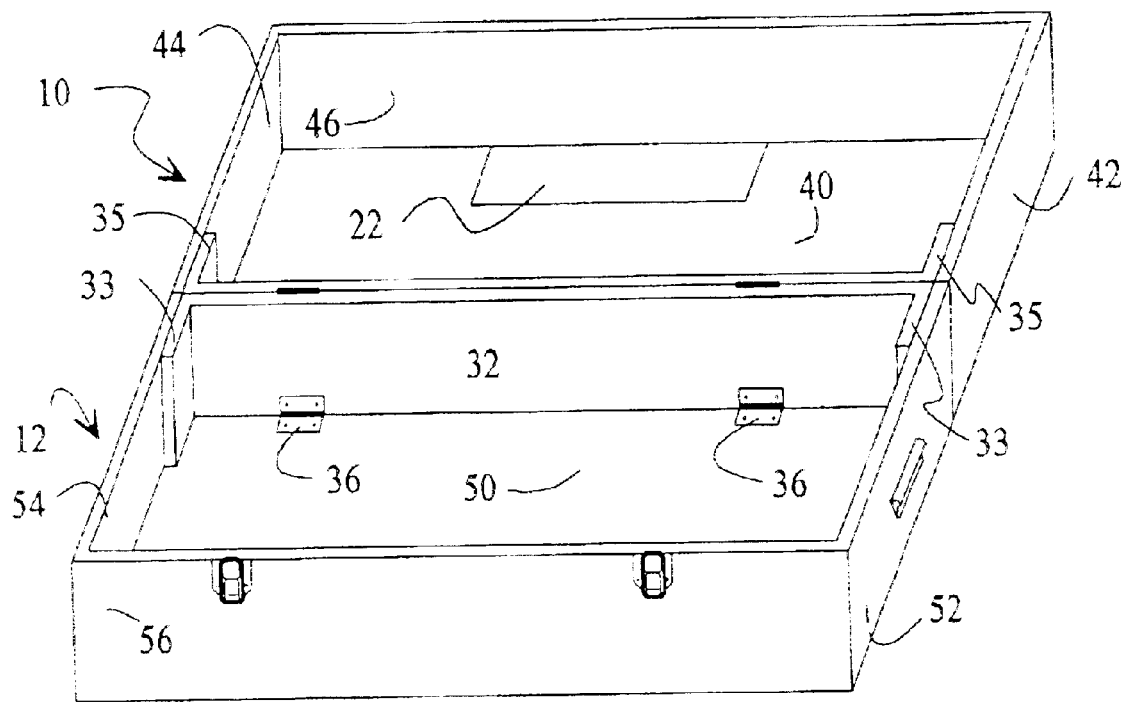
FIG. 4 is a front perspective view of the convertible cargo box-bed liner of FIG. 1 in a partially converted state.
Figure 5:
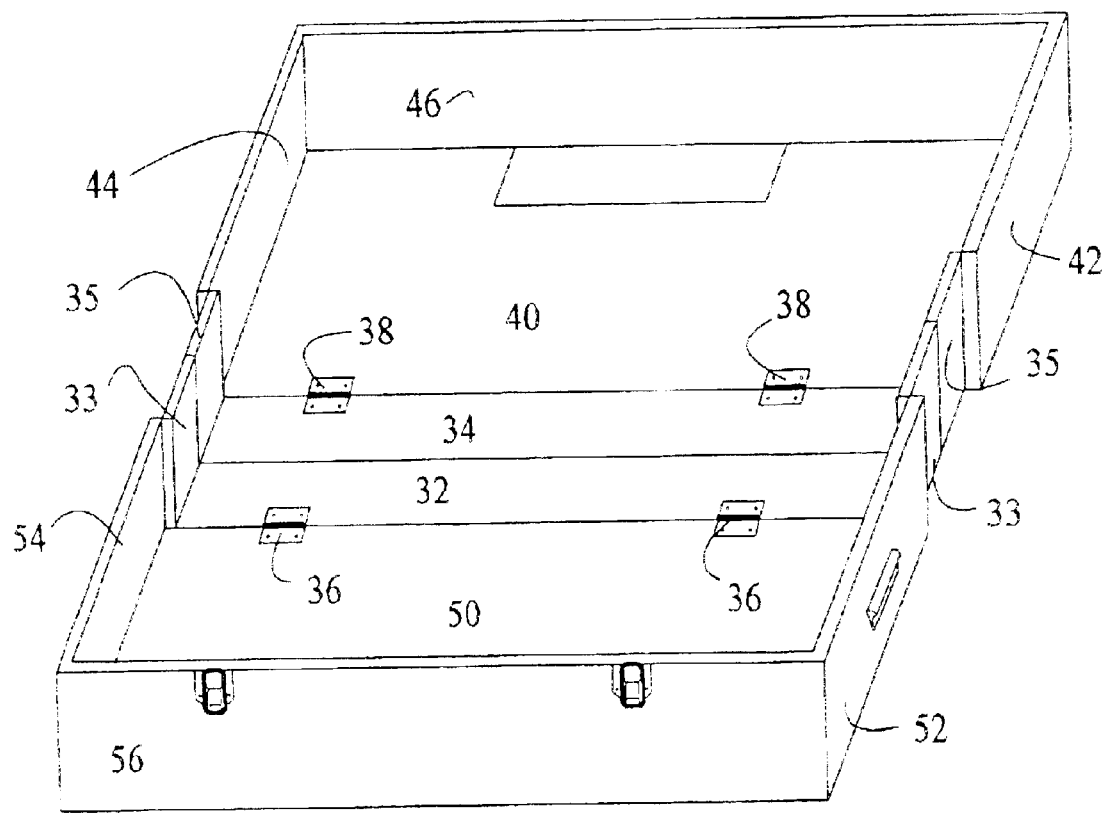
FIG. 5 is a front perspective view of the convertible cargo box-bed liner of FIG. 1 in its bed liner state.

Box-bed liner apparatus 1 can further be used in an expanded configuration, as illustrated in FIGS. 4 and 5. In this expanded state, apparatus 1 provides protection to the bottom and sides of a vehicle's cargo area. This enables a user to move dirty, corrosive, or abrasive materials without damaging the interior of the vehicle.

FIG. 4 shows the box-bed liner apparatus in partially expanded position. In FIG. 4, latches 18 and 20 have been undone and top half 10 has been pivoted open along hinges 14 and 16. As can be seen in this figure, however, opening the top along these hinges does not provide the user with use of the entire cargo area. In order to overcome this difficulty, box-bed liner apparatus 1 is further provided with hinged rear panels 32 and 34. These panels are pivotally connected to bottom half 12 and top half 10 respectively using hinges 36 and 38.

In an alternative embodiment, hinges 14 and 16 are not included in apparatus 1. This enables rear panels 32 and 34 to be connected together along their centre, creating a single back rather than a split back. The transformation of apparatus 1 between its closed configuration and its open configuration would occur by pivoting rear panels 32 and 34 along hinges 36 and 38.

Figure 3:
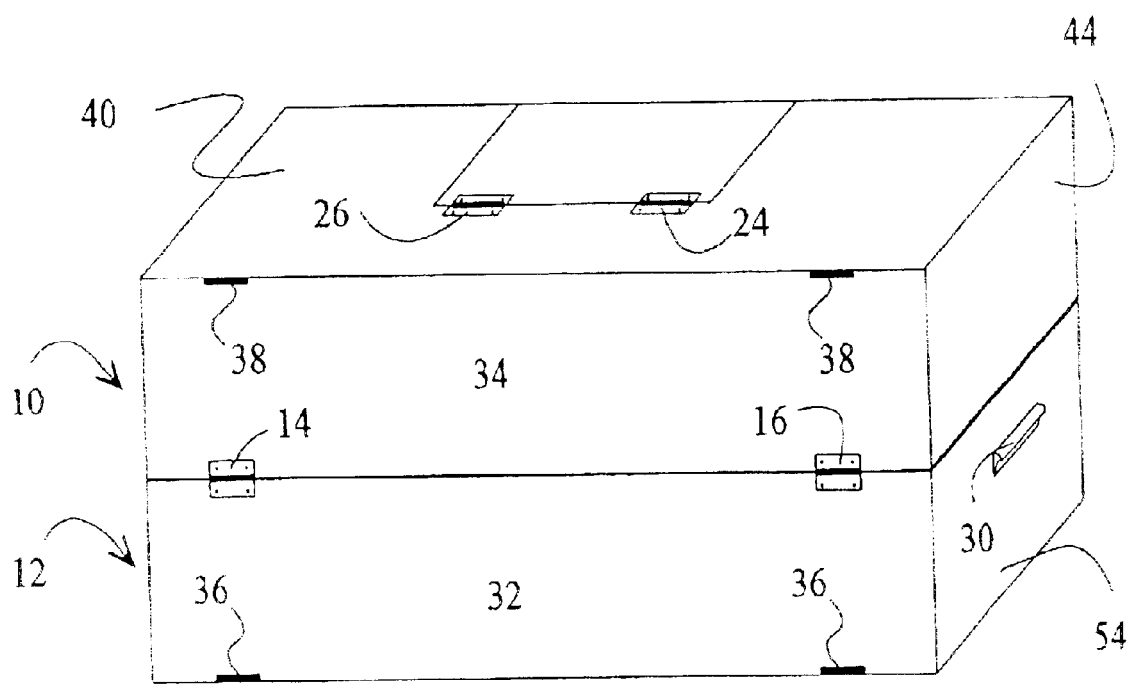
FIG. 3 is a rear perspective view of the convertible cargo box-bed liner of FIG. 1.

When box-bed liner apparatus 1 is in its closed position, panels 32 and 34 are the back of apparatus 1, as is best seen in FIG. 3. When apparatus 1 is in a fully expanded state, panels 32 and 34 form part of the bottom of apparatus 1.

Panel 32 is further provided with side members 33. Side members 33 extend forwardly from panel 32 along its extreme edges when apparatus 1 is in the closed position. Side members 33 fit precisely within top and bottom halves 10 and 12. The depth of side members 33 in the preferred embodiment will be the same as the height of bottom half 12.

Similarly, panel 34 is provided with side members 35 extending forwardly when apparatus 1 is in a closed configuration.

Apparatus 1 may also be provided a right angled latch between top panel 40 and panel 34 along their hinged edge. This would allow top panel 40 to be maintained at right angles with rear panel 34 until the user was ready to open apparatus 1 into its cargo liner configuration. This would further facilitate the placing of larger objects into apparatus 1 in is box configuration by allowing the top half 10 to be pivoted away from bottom half 12 to place an object within apparatus 1 that would not fit through access port 22.

Similarly, a right angle latch could be added between bottom panel 50 and rear panel 32 along their hinged edge, preventing any pivoting about hinge 36.

When apparatus 1 is expanded, side members 33 and 35 are pivoted with panels 32 and 34, providing a portion of the side to apparatus 1 in its expanded configuration. In this way there are no gaps and the vehicle cargo area remains protected.

Transformation of apparatus 1 is accomplished by securing access port 22, undoing latches 18 and 20, pivoting top half 10 along pivots 14 and 16, and then pulling top half 10 laterally away from bottom half 12. This last action allows panels 32 and 34 to pivot and form an extended and flat bottom for the bed liner apparatus 1. Further, side members 33 and 35 pivot up to form a continuous side wall to ensure that any materials placed within this liner cannot fall out during driving conditions.

Box-bed liner apparatus 1 can be formed of any material that is rugged and easy to clean. Examples include wood, metal and polymers.

The dimensions of apparatus 1 can vary to accommodate the various sized cargo areas in different vehicles. In one embodiment, the dimensions of box/bed liner apparatus 1 adapted for use in a Jeep Cherokee Sport™ can be:

| Jeep Cherokee Sport ™ Example |
|---|
| 1.07 m (w) × 0.373 m (d) × 0.432 m (h) - Storage capacity = 0.0172 m$^3$ |
| 1.07 m (w) × 1.18 m (d) × 0.216 m (h) - usable area = 1.26 m$^2$ |

As one skilled in the art will appreciate, other vehicles will have varied widths, depending on the sides of the vehicle or on wheel wells within the cargo area, and varied depths depending on the length of the vehicle and cargo area. The present invention can be custom configured for these various sized cargo areas.

Although the present invention has been described in detail with regard to the preferred embodiment thereof, one skilled in the art will easily realize that other versions are possible, and that the invention is only intended to be limited in scope by the following claims.

What is claimed is:

1. A transformable storage and protection apparatus comprising:

a top half portion;

a bottom half portion;

a back portion;

first hinge means disposed between said top half portion and said back portion; and second hinge means disposed between said bottom half portion and said back portion; and a third hinge means about the center of said back portion, wherein said transformable storage and protection apparatus transforms between (1) a first configuration in which said top half portion, said bottom half portion and said back portion form a closed container; and (2) a second configuration in which said top half portion is pivoted along said first hinge means, and said back portion is pivoted along said second hinge means thereby forming a single planar bottom area.

2. The transformable storage and protection apparatus of claim 1, wherein said back portion further comprises side members, whereby, when in said first configuration, said side members fit within said top half portion and said bottom half portion.

3. The transformable storage and protection apparatus of claim 1, further comprising a looking means to secure said transformable storage and protection apparatus when in said first configuration.

4. The transformable storage and protection apparatus of claim 1, further comprising handle means disposed about opposite ends of said bottom half portion.

5. The transformable storage and protection apparatus of claim 1, further comprising a lid means disposed in said top half portion to allow access to the inside of said transformable storage and protection apparatus when in said first configuration.

6. A transformable storage and protection apparatus comprising:
   a top half portion;
   a bottom half portion;
   a back portion having side members;
   first hinge means disposed between said top half portion and said back portion; and
   second hinge means disposed between said bottom half portion and said back portion,
   wherein said transformable storage and protection apparatus transforms between (1) a first configuration in which said top half portion, said bottom half portion and said back portion form a closed container whereby, said side members fit within said top half portion and said bottom half portion; and
   (2) a second configuration in which said top half portion is pivoted along said first hinge means, and said back portion is pivoted along said second hinge means thereby forming a single planar bottom area.

7. The transformable storage and protection apparatus of claim 6, further comprising a locking means to secure said transformable storage and protection apparatus when in said first configuration.

8. The transformable storage and protection apparatus of claim 6, further comprising handle means disposed about opposite ends of said bottom half portion.

9. The transformable storage and protection apparatus of claim 6, further comprising a lid means disposed in said top half portion to allow access to the inside of said transformable storage and protection apparatus when in said first configuration.

* * * * *